United States Patent [19]

Dann et al.

[11] 3,887,941

[45] June 3, 1975

[54] SYNCHRONIZING PULSE PROCESSOR FOR A VIDEO TAPE RECORDER

[75] Inventors: Bert H. Dann, Mountain View; Nikola Vidovic, Sunnyvale, both of Calif.

[73] Assignee: International Video Corporation, Sunnyvale, Calif.

[22] Filed: Sept. 1, 1972

[21] Appl. No.: 285,919

[52] U.S. Cl. ................ 360/36; 178/69.5 F; 360/14; 360/37

[51] Int. Cl. ........................... H04l 7/00; H04n 5/04

[58] Field of Search ........... 178/6.6, 66 A, 69.5 TV, 178/69.5 G, 69.5 F, 69.5 DC; 328/62, 63, 187; 360/36, 37, 14

[56] References Cited

UNITED STATES PATENTS

| | | | |
|---|---|---|---|
| 2,752,424 | 6/1956 | Pugsley | 178/69.5 TV |
| 3,006,995 | 10/1961 | Fathauer | 178/69.5 DC |
| 3,065,296 | 11/1962 | Marsden | 178/69.5 TV |
| 3,359,367 | 12/1967 | Hiatt, Jr. | 178/69.5 G |
| 3,518,374 | 6/1970 | Askew | 178/69.5 DC |
| 3,567,861 | 3/1971 | Webb et al. | 178/69.5 DC |
| 3,582,963 | 6/1971 | Bennett | 178/69.5 G |
| 3,716,795 | 2/1973 | Brown | 178/69.5 G |
| 3,758,720 | 9/1973 | Dinn | 178/69.5 DC |

*Primary Examiner*—Gareth D. Shaw
*Attorney, Agent, or Firm*—Limbach, Limbach & Sutton

[57] ABSTRACT

A technique for deriving timing pulses and reference signals for video processing circuits and tape driving mechanisms of a video tape recorder (VTR). The output signal of the VTR must have horizontal and vertical components having a predetermined relationship to the input synchronizing signals. A clock pulse is generated at a multiple of the horizontal rate of the input synchronizing signals through the medium of a phase-lock loop. A series of dividers is fed at the clock-pulse rate and appropriately reset by the vertical component of the input synchronizing signal such that output synchronizing signals are available which are advanced in time by an integral number of half-line intervals (by one or two lines in the preferred embodiment) with respect to the input synchronizing signal. These signals are further conditioned by a digital delay system including a counter fed at the clock-pulse rate such that the final output synchronizing signals may be adjusted relative to the input in increments corresponding to the clock-pulse interval. The output signal of the VTR will be synchronous with these final output synchronizing signals since they form the basic servo and time-base-corrector references during playback. In editing operations it is necessary to obtain a particular timing relationship between the signal about to be recorded and the playback signal; this relationship will change as the result of environmental changes and mechanical differences between VTRs. The required advance or delay of the timing references is determined automatically (or manually) during the EDIT PLAY mode, and the count corresponding to the required digitally determined delay is stored in latches at the time of switching to the EDIT RECORD mode. Thus the timing established during EDIT PLAY is maintained by a digital memory function during EDIT RECORD.

18 Claims, 4 Drawing Figures

SYNCHRONIZING PULSE PROCESSOR FOR A VIDEO TAPE RECORDER

BACKGROUND OF THE INVENTION

This invention relates generally to video synchronizing pulse processing circuits, especially those used to satisfy the particular requirements of a video tape recorder.

The video signal processing circuits of a video tape recorder include some inherent delay. Therefore, if a video tape is played back in synchronism with a television station composite synchronizing signal, the output of the video tape recorder is delayed with respect to the station synchronizing signal. This is undesirable since a video tape recorder, as a source of video program material, must be in synchronism with all other sources of video program material. Such synchronism allows smooth switching between sources of program material. In order to accomplish this result, the magnetic tape drive of a video tape recorder is advanced with respect to the station synchronizing signal so that the output of the tape recorder after experiencing the inherent delay, is in synchronism therewith. The prevalent technique utilized in existing video tape recorders for advancing playback elements with respect to a station synchronizing signal is to rely upon the output pulse width of multivibrator circuits. This technique is undesirable because of inherent instability of multivibrator circuits. Therefore, it is a primary object of the present invention to improve the stability of input synchronizing signal processing circuits for video tape records and other applications.

Another common feature of a video tape recorder is to provide for editing a recorded tape by inserting new program materials. As a tape is being played back an insert is made from some other video source by switching the tape recorder to its record mode. To obtain a smooth transition on the tape, the synchronizing pulses of the signal to be recorded must be in phase with those already recorded on the tape at the tape recorder head. Because of the inherent delay in the recorder circuits in both playback and record modes or timing discrepancies between the input video and input synchronizing signals, the synchronizing signals driving the tape recorder mechanisms must be shifted with respect to the input synchronizing signals. Existing multivibrator analog circuits do not provide the required long-term stability and it is an object of the present invention to improve stability. It is a further object of the present invention to automatically adjust the various synchronizing reference signals when the video tape recorder is in its EDIT PLAY mode.

SUMMARY OF THE INVENTION

These and additional objects are accomplished by the present invention wherein a clock pulse is generated at a multiple of the horizontal rate of the input synchronizing signal through the medium of a phase-lock loop. A series of dividers is fed at the clock-pulse rate and appropriately reset by the extracted vertical component of the input synchronizing signal. Field pulses are obtained as the counter completes its cycle and is reset. This unadvanced field pulse is used for normal recording in the video tape recorder. Upon playback, a reference field pulse is derived from the counter at least one horizontal line in advance of its being reset, thereby producing an advanced field pulse. An advanced frame pulse is derived by coincidence of every other advanced field pulse and corresponding horizontal information; this advanced frame pulse and the clock pulse are the inputs to a digital delay system from which advanced or delayed horizontal, vertical, and frame pulses are derived, the relative timing of these being adjustable over a range (of over two horizontal lines in the preferred embodiment) in increments corresponding to the clock-pulse interval. This advance or delay compensates for inherent delays in the tape recorder and external circuitry and produces a playback signal at the VTR output which is substantially in synchronism with the station composite synchronizing signal. Therefore, the video tape recorder can be switched in and out of a video program without any undesirable sudden changes in timing.

In normal playback, the advance or delay is adjusted by means of manually-operated switches which predetermine the number of clock-pulse intervals encompassed by the digital delay system. In addition to other functions already mentioned, this precise control of machine timing allows accurate compensation of cable delays in large video systems.

When the video tape recorder is being utilized in an edit mode, the manual switches interposing delay in the advanced field pulse are disabled in favor of a voltage controlled one-shot multivibrator that is triggered by the advanced field pulse. The width of the multivibrator pulse is controlled by a voltage from a comparator which compares the phase of a delayed replica of the station composite synchronizing signal and the playback signal. The trailing edge of the multivibrator output pulse is used to generate a pulse that is thus delayed from the advanced field pulse and from which machine timing references are derived. The delay between the advanced field pulse and the trailing edge of the multivibrator output pulse is represented by the count attained in the digital-delay-system counter, which is reset prior to and clocked during this interval. The count attained is strobed into the latches at the trailing edge of the multivibrator output pulse. When the VTR goes from the EDIT PLAY to the EDIT RECORD mode the contents of the latches is applied to the digital delay system to assure that its attained count, and hence the delay secured, will be the same as that which obtained in EDIT PLAY.

Additional objects and advantages of the present invention will become apparent from the following detailed description of its preferred embodiment which should be taken in conjunction with the drawings.

DESCRIPTION OF THE PREFERRED EMBODIMENTS

Figure 1A:
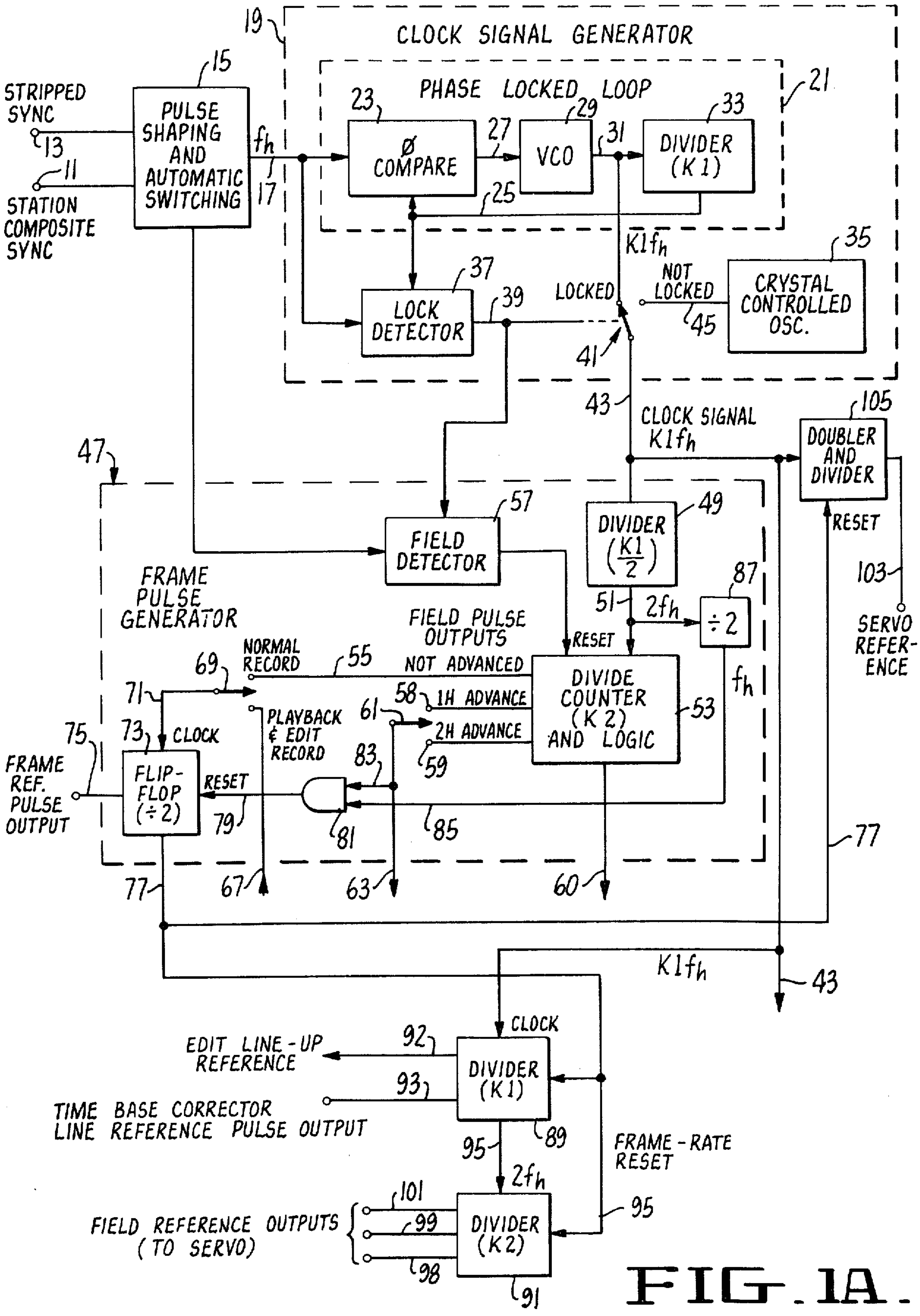
FIG. 1 is a system block/diagram of an input synchronizing signal processor according to the present invention.
Figure 1B:
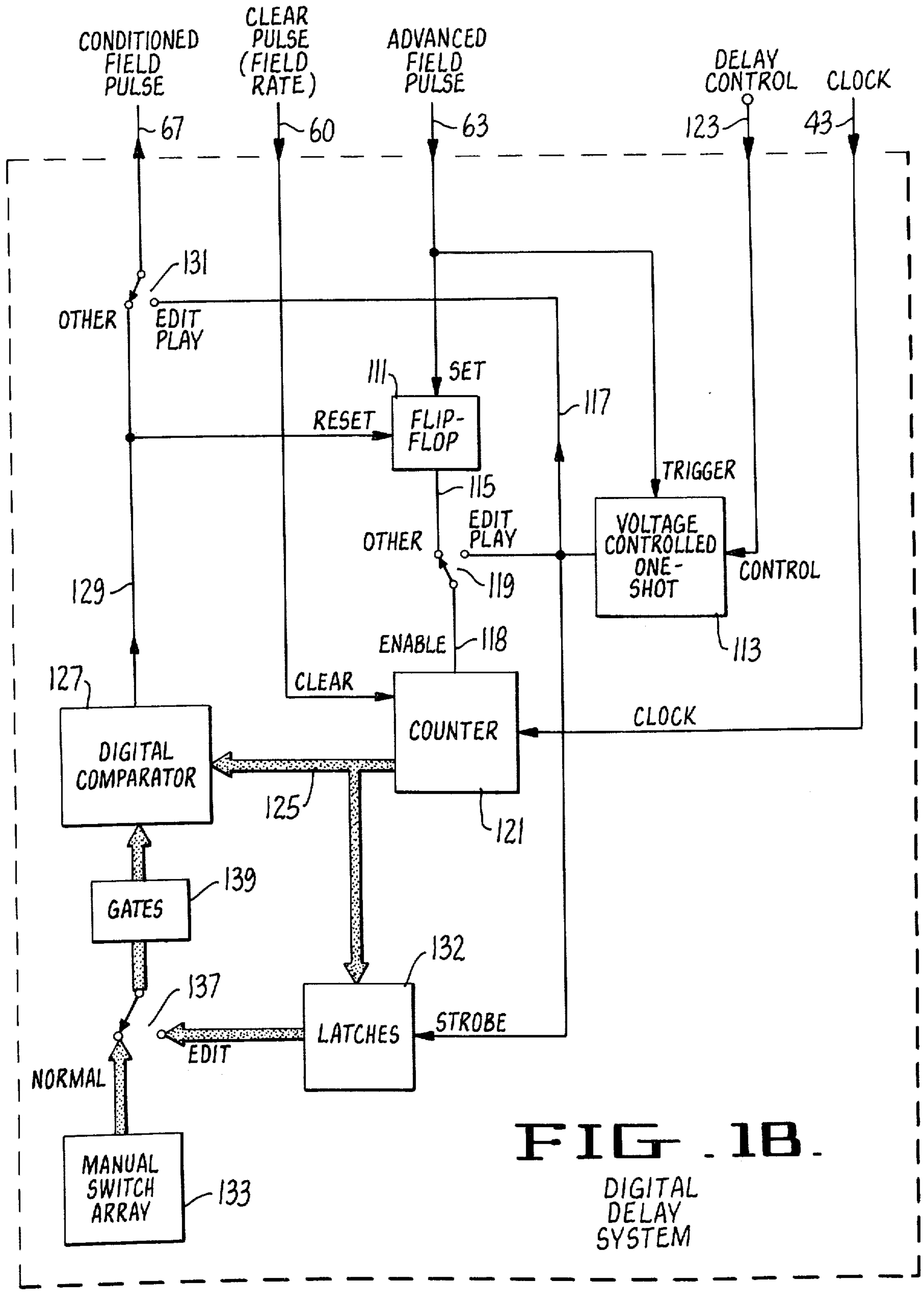

A specific example of an input synchronizing pulse processor is shown in block diagram form in FIG. 1. This particular system has four distinct modes of operation. Two of these modes are denoted as "normal," one being normal-record and the other being normal-playback. The remaining two modes of operation are denoted as edit-record and edit-playback, and are used during editing previously recorded video tape.

Referring to FIG. 1, a station composite synchronizing signal is applied to a terminal 11. Another synchronizing signal is applied to a terminal 13 which has been stripped from the composite video signal to be recorded. Both the terminals 11 and 13 are connected with a circuit block 15 which includes means for shaping the synchronizing signals in an appropriate manner at its output 17, and also provides means for automatically switching from the station synchronizing signal at the terminal 11 to the stripped synchronizing signal at the terminal 13 if the station signal is absent.

The synchronizing signal at the output line 17 is applied to a clock signal generator 19 which includes as its primary component a phase locked loop 21. The synchronizing pulses in the line 17 are applied to a phase comparison circuit 23 within the phase locked loop 21. The phase comparison circuit 23 compares the phase of "window" pulses in a feedback line 25 with that of the pulses in the input line 17. An error signal is generated in a line 27 at the output of the phase comparison circuit 23 whose voltage is proportional to the magnitude of the phase difference detected. The error signal in the line 27 is applied to a voltage controlled oscillator (VCO) 29 and thus determines the output frequency of the VCO in the line 31. A divider system 33 in the form of decimal counters clocked by the VCO output signal in the line 31 and a window pulse appears on output line 25. The VCO output in the line 31 thus becomes locked to the horizontal line pulses of the synchronizing signal in the line 17 but at a frequency that is a multiple thereof by a constant K1 that is the predetermined count of the counter within the divider system 33.

The clock signal generator 19 additionally includes a crystal controlled oscillator 35. A lock detector 37 compares the phase of the synchronizing pulses in the line 17 with that of pulses in the feedback line 25 of the phase lock loop 21. The lock detector 37, in a preferred form, includes a flip-flop that is set by the feedback window pulse in the line 25 and is reset by a horizontal line pulse from the line 17, and thus will remain reset if the pulse remains within the window. The output pulses of the flip-flop are integrated and the output of the integrator circuit is applied to a comparator which provides an output when the integrator output exceeds a threshold level. When an unlocked condition is detected, the change in signal in the line 39 causes a switch 41 to change connection of a clock signal output line 43 from the VCO output line 31 to a line 45 that is the output of the crystal controlled oscillator 35.

The composite synchronizing signal for the United States monochrome system differs slightly from the United States color television systems (NTSC) and both of these United States systems differ from the European PAL and SECAM color systems. For the European system, the constant K1 of the divider 33 is, as a specific example, equal to 504. This means that a pulse is emitted in the output line 25 of the divider 33 every 504th cycle of the VCO 29 output in the line 31. The frequency of the oscillator 29 in its output line 31 is thus 504 times the horizontal line pulse repetition rate of the input composite synchronizing signal. This oscillator frequency is 7.875 MHz. For the U.S. systems, the constant K1 of the divider 33 may be, in a specific example, made equal to 500. The output frequency of the oscillator 29 remains equal to or close to 7.875 MHz. The specific constants chosen for the divider 33 permit operation with substantially the same frequency clock signal in the line 23 for both the U.S. and the European television systems. The frequency of the crystal controlled oscillator 35 is thus also set at 7.875 MHz.

A frame pulse generator 47 receives a clock signal in the line 43 at a divider 49 which is a counter having a predetermined count of one half the constant K1. That is, for the European system, the divider 49 will count 252 while for the U.S. system, it will count 250. An output line 51 of the divider 49 carries a pulse train having a frequency twice the horizontal line frequency ($2f_h$) of the input composite synchronizing signal. The signal in the line 51 is a clock signal which drives the dividing counter and logic circuit block 53. This counter has a predetermined count of 625 for the European television system and 525 for the U.S. system.

An output line 55 carries a pulse which occurs once each field of video information..To assure that the pulse in the output line 55 is coincident with a field pulse in the input composite synchronizing signal, a field detector 57 receiving the composite sync on line 18 is connected to reset the counter within the block 53 upon occurrence of a field pulse in the input signal. Such a reset pulse merely serves to phase the counter within the block 53 and once phased, this counter is not affected by the reset pulse at the output of the field detector 57.

In the absence of proper lock-up of the clock signal generator, vertical reset action if not meaningful, since synchronous operation is not being attained in any case. If the input composite synchronizing signal is replaced by random noise, as may occur when dubbing from another VTR if its progresses beyond the point at which a signal has been recorded, then random reset action will occur if false pulses from detector 57 are allowed to reset counter 53. To prevent this, the output of lock detector 37 which appears on line 39 is also applied to field detector 57 to inhibit its output in the "not locked" condition. The absence of the field reset pulses does not impair any of the outputs of block 53; the system continues to provide a coherent set of output signals at the correct rates (within the limits of crystal oscillator accuracy) although of course no longer phased to any outside references.

The counter in the block 53 is clocked two counts for each horizontal line pulse of the input synchronizing signal since two pulses for each horizontal line are generated in the line 51.

In addition to the dividing counter, the block 53 includes logic circuitry connected thereto for emitting in a line 58 a pulse one horizontal line time 1H (two counts of the counter within the block 53) in advance of the field pulse output in the line 55. Similarly, pulses appear in the line 59 two horizontal lines 2H (four counts of the counter in the block 53) ahead of the non-advanced field pulse in the line 55. A switch 61 selects between the lines 57 and 59 to present an advanced field pulse output in a line 63. If a dropout compensator is used in the video processing circuits, the switch 61 is connected with the line 59 to advance the field pulse an additional horizontal line time to compensate for the one-line delay of the dropout compensator.

The advanced field pulse signal in the line 63 is applied to a digital delay system 65 for controllably delaying the advanced field pulse for over two horizontal line times, in increments of one clock-pulse intervals. The advanced field pulse after being delayed a controlled amount, as described hereinafter, appears in an output line 67 of the digital delay system 65. A switch 69 within the frame pulse generator 47 selects between the line 55 for a field pulse that is not advanced and the line 67 for the field pulse that has been conditioned by the digital delay system 65. A line 71 from the output of the switch 69 is connected to a flip-flop circuit 73 which serves to divide the field pulses applied to it as a clock source by two and provide in output lines 75 and 77 pulses at a frame rate. The pulses in the lines 75 and 77 occur at substantially the same time but, because of their different uses, are shaped quite differently and are of a different time duration.

The purpose of switch 69 is to allow exact synchronism between the several outputs of the synchronizing pulse processor and the input synchronizing signal during the normal record mode by connecting lines 55 and 71 in this mode. Through the medium of the servo-system references the exact position of the recorded video on the tape is thus standardized. In all other modes, an adjustable timing relationship is required, and thus switch 69 connects line 71 to the output of the digital delay system at line 67.

To assure that the pulses in the lines 75 and 77 occur during the proper field pulse to produce a frame pulse, the flip-flop divider circuit 73 is reset by a pulse in a line 79 which occurs at the output of an AND gate 81. An input line 83 to the AND gate 81 is connected to the advanced field pulse output line 63. The other input of the AND gate 81 is connected by a line 85 to the output of a divider circuit 87. The divider circuit 87 emits one pulse in its output line 85 for every two pulses at its input from the line 51. Therefore, the pulses in the line 85 are set at a horizontal line rate. The AND gate 81 emits a pulse in its output line 79 whenever the horizontal line pulse in the line 85 is coincident in time with an advanced field pulse output in the line 63.

The frame-rate reset pulses in the line 77 serve to phase counter systems 89 and 91. The counter 89 has a predetermined count of 504 for the European television system and 500 for the U.S. television system, for example. The counter 89 is run from the clock signal in the line 43, which is at 7.875 MHz in this example. An output line 93 of the counter 89 is a special composite wave occurring at the horizontal rate and carrying in its significant transitions timing references for the servo and time-base-corrector systems of the VTR. The timing relationship between these significant transitions (four in number in the preferred embodiment) and their relationship to the frame-rate reset pulses of line 77 are established by selective gating within the counter system 89. These relationships remain constant with respect to each other as the timing of the frame-rate reset pulses to the input synchronizing signal is altered as described above. Stated differently, the composite waveform can be viewed as two or more pulse trains each occurring at the horizontal rate but displaced or staggered with respect to each other. In some VTR's it may be useful to output each pulse train on separate lines, however, they are combined here in a single output line 93.

Another output from counter system 89 provided at line 95 consists of pulses at twice horizontal line rate in which significant transitions also bear a constant relationship to the frame-rate reset pulses of line 77. These are applied as clock pulses to counter system 91 described below.

Counter system 91 has a predetermined count of 625 for the European system and 525 for the United States system, is clocked by line 95 described above, and reset by frame-rate reset line 77. Three field-rate outputs having a constant timing relationship to each other and to the frame-rate reset pulses are established by selective gating within counter system 91 and appear at output lines 98, 99, and 101. These are used as timing references in the several servo systems of the VTR. These frame-rate outputs on separate lines 98, 99 and 101 are analogous to the composite horizontal rate pulses appearing on line 93 from block 89.

Another servo reference signal also phased by frame-rate reset line 77 is provided at output line 103 by doubler and divider system 105. The same division ration is used in both European and U.S. systems, since the output rate (nominally 42 KHz in the preferred embodiment) is in all cases an integral multiple of the television frame-rate. This reference signal is used to determine the basic rotational rates of the capstan and scanner motors in the VTR.

As described above, the action of switch 69 disconnects the digital delay system during the NORMAL RECORD mode. In NORMAL PLAY mode, the advance or delay imposed is determined by the setting of switch array 133 as described hereinafter.

The advanced field pulse of line 63 sets flip-flop 111 and its output line 115 is carried via switch 119 and line 118 to the count-enable input of counter 121. It will be understood, here as in other parts of this description, that unless manual switches are specifically called out, switching functions are actually performed by gating circuitry.

Counter 121 is clocked by clock line 43 and its parallel output compared against the information set into a manual switch array 133. The counter output reaches digital comparator 127 via line 125, and the switch array output reaches the comparator via switch 137 and gates 139. When the attained count equals that set into the manual switch array, the comparator produces an output pulse on line 129. This pulse forms the useful output of the digital delay system, the conditioned field pulse of line 67, to which it is connected by switch 131.

The comparator output on line 129 is also applied to the reset input of flip-flop 111. When flip-flop 111 is reset the enable input is removed from counter 121 and counting action ceases.

Dividing counter and logic system 53 provides an output pulse on line 60 which clears counter 121 once per field. This pulse occurs several lines in advance of the non-advanced field pulse (12.5 lines in advance in the preferred embodiment). The counter is thus ready to repeat the counting sequence described above each time the advanced field pulse appears on line 63.

In EDIT PLAY mode the positions of switches 119, 131, and 137 are altered per the labels shown. In this mode the advanced field pulse of line 63 is used to trigger voltage-controlled one-shot 113. The trailing edge of the pulse from this one-shot, which appears on line 117, is now the useful output of the digital delay system: the conditioned field pulse of line 67, to which it is connected via switch 131. The duration of the pulse is controlled manually or automatically by a D.C. potential applied to one-shot 113 via control line 123.

During EDIT PLAY, a digital representation of the one-shot pulse duration is generated in counter 121 and subsequently stored in latches 132. During the one-shot output pulse which appears on line 117, counting in counter 121 is enabled via switch 119 and line 118. The duration of the one-shot pulse will thus be measured in terms of clock-pulse intervals, and the binary number representing pulse duration appears on counter output lines 125 which are connected to latches 132. At the trailing edge of the one-shot pulse, the attained count will be strobed into the latches, strobe control being connected to the latches by line 117. Thus at the emergence of each conditioned field pulse on line 67, the latches outputs will represent a binary number which accurately reflects the delay introduced by one-shot 113. By manual or automatic control, this delay has been set to that required for correct edit line-up.

In the EDIT RECORD mode we wish to maintain this same delay. As the machine goes from EDIT PLAY TO EDIT RECORD, which occurs at a predetermined time in advance of the conditioned field pulse of line 67, switches 119 and 131 revert to positions corresponding to those obtaining in the NORMAL PLAY mode. However, switch 137 remains in its EDIT position, and thus the delay of the digital delay system is determined by the contents of the latches 132 rather than the manual switch array 133. Since the contents of the latches 132 remain unaltered during an EDIT RECORD sequence of any length, the "remembered" required edit-line-up delay is maintained with excellent stability.

Figure 2:
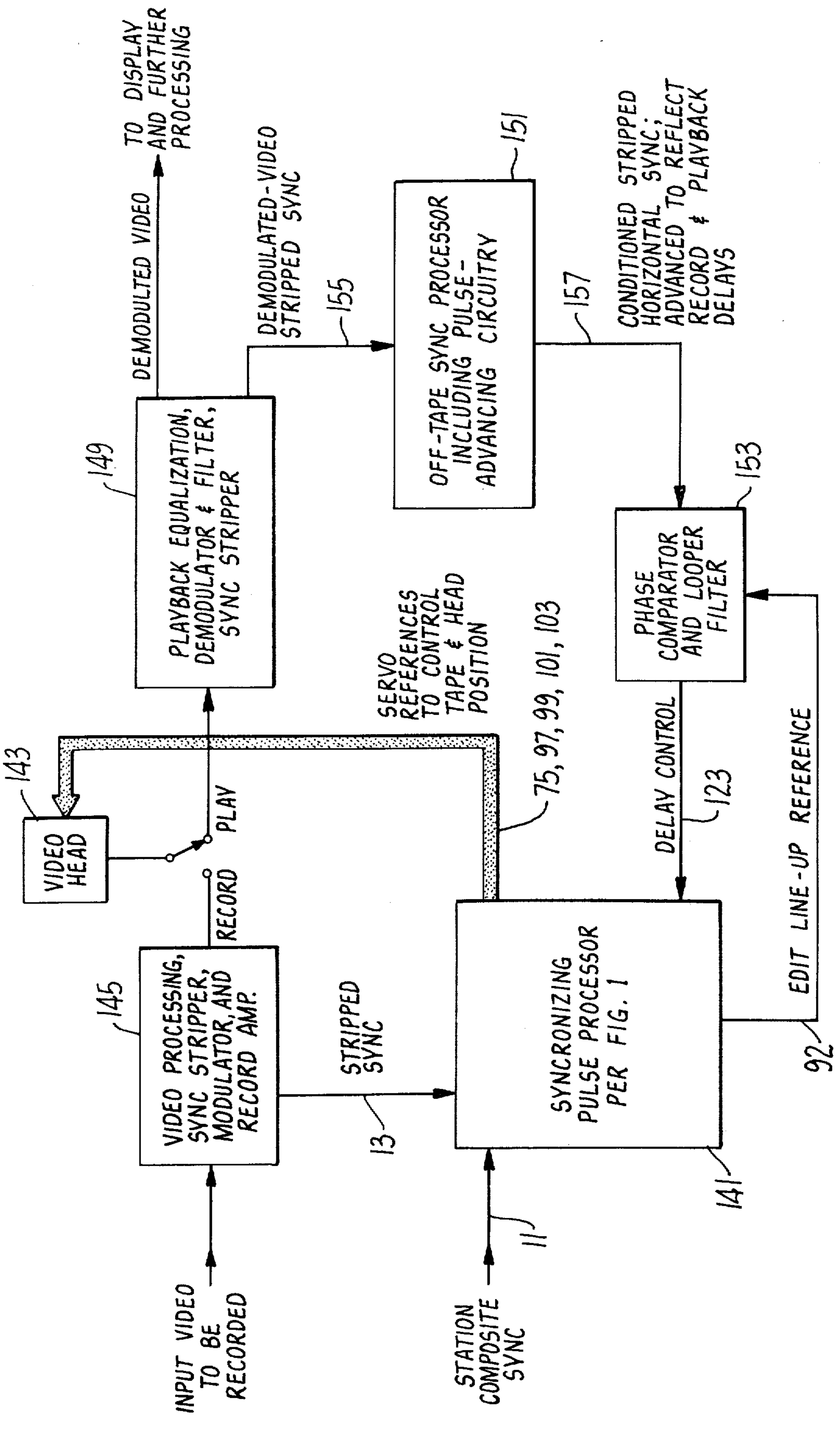
FIG. 2 is a block diagram showing use of the input synchronizing signal processor of FIG. 1 in edit modes.

Means for securing automatic edit line-up are outlined in FIG. 2. The following description will be made in terms of a single video head, but it will be understood that this description is equally applicable to multiple-head VTRs employing appropriate head-switching means.

To secure a transition between playback and record modes in assemble or insert editing such that no excessive phase discontinuity will be experienced in subsequent playback through the edit, it is necessary that the video head and tape position (i.e., playback timing) be such that the relative phase of the signal being reproduced at the head be identical to that of the signal about to be recorded, at the head. The relative phase of these signals is commonly evaluated in terms of the timing of the leading edge of the horizontal synchronizing signal in each case. Because of inherent time delays occurring in the recording and playback electronics, we do not have direct access to this relative phase information at the head, but because these dalays are invariant, we can take them into account by appropriately advancing the phase of the playback horizontal synchronizing information. Given these two signals, properly conditioned, we can now apply them to a phase comparator and produce a delay-control error signal which by means of the synchronizing pulse processor of FIG. 1 described above will adjust the head and tape position to minimize this error, thus achieving automatic edit line-up.

It is a feature of the automatic edit line-up system described that it will operate with either stripped sync or station composite sync, and because of the wide advance/delay range available it will accommodate any practical relative delay in arrival of the video to be recorded and the station sync. It is of course assumed that these signals are synchronous, but a relative delay is often found in large systems due to differing cable lengths, processing delays, etc.

Referring to FIG. 2, the video signal is modulated form is reproduced by video head 143 and its output is conditioned by playback electronics 149 to secure demodulated-video stripped sync on line 155. This stripped sync is conditioned by off-tape sync processor 151 to secure an advance which is equal to the combined recording and playback delays; the conditioned output appearing on line 157. An edit line-up reference is provided by synchronizing pulse processor 141 on line 92; this horizontal-rate information is phased to the horizontal component of the video signal about to be recorded.

The horizontal-rate signals of lines 92 and 157 described above are applied to phase comparator 153 to secure a delay-control error signal output on line 123, and this alters the timing of the servo-reference outputs of the synchronizing pulse processor 141 in the manner described previously. This results in a change in head and tape position in a direction to minimize the error signal; this closed-loop action thus provides the desired edit line-up action as shown in FIG. 2.

Figure 3:
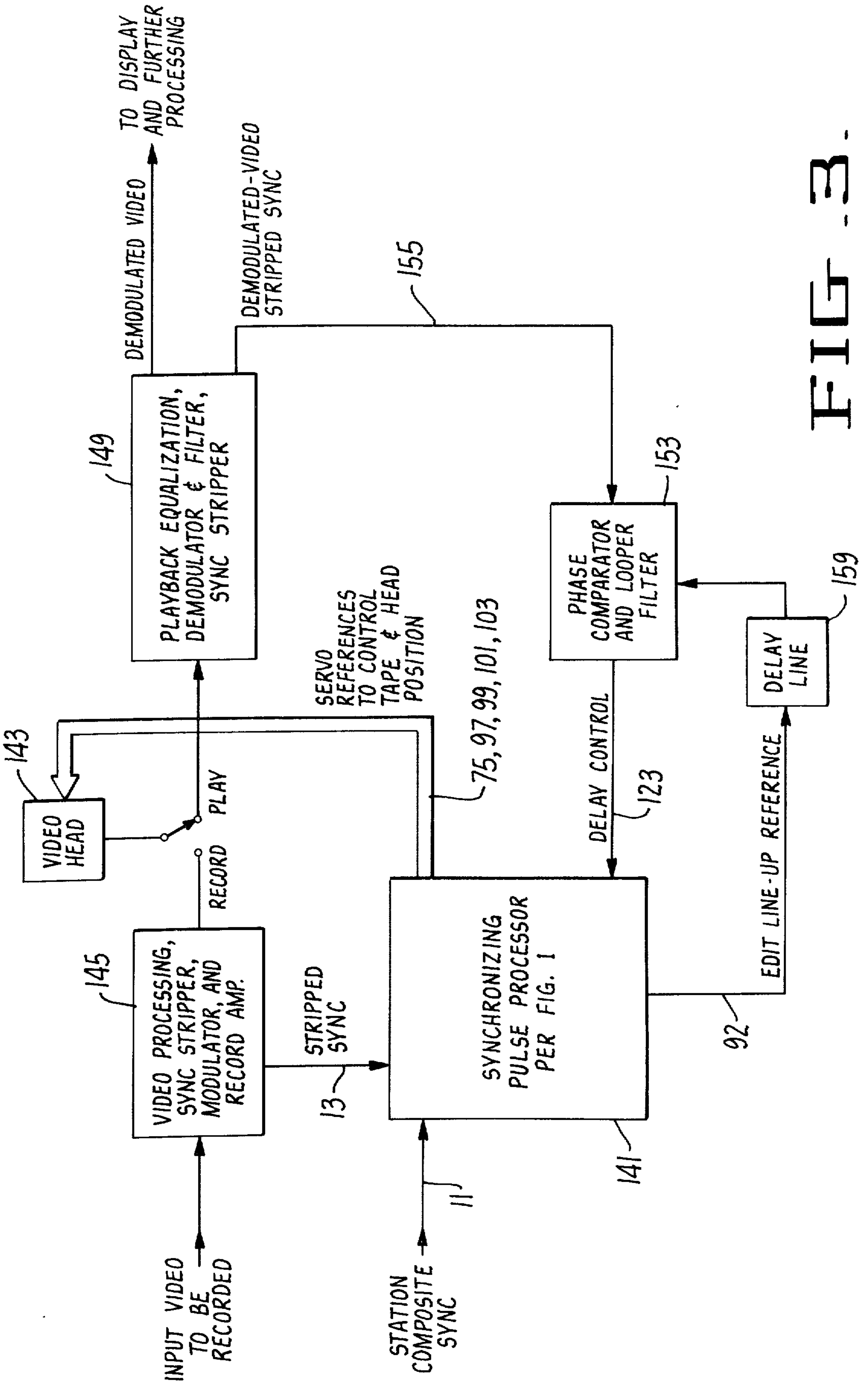
FIG. 3 is a block diagram showing an alternative embodiment of FIG. 2.

Alternatively, as in FIG. 3, block 151 may be omitted and the stripped sync on line 155 applied directly to phase comparator 153. A delay line 159 is inserted in line 92, its delay set to reflect the combined record and playback delays. The resulting circuit functions the same as that of FIG. 2, in one case the off-tape horizontal is advanced and in the other case, the reference horizontal is delayed. The two approaches are equivalent.

The synchronizing pulse processor thus described provides a plurality of highly stable reference sync signals for use in various portions of a video tape recorder. By utilizing a phase locked loop and counter approach excellent noise filtering is provided, that is, the output sync signals are not dependent on clean input reference signals. The internal clock crystal oscillator permits continuous output signals even if the input references are disrupted and also permits remote operation where no references are available. The array of output reference signals all maintain high accuracy with respect to external reference signals or to internal crystal oscillator and moreover maintain high accuracy with respect to their time spacings relative to each other while permitting very small incremental adjustments (in increments of the clock interval — 127 nanoseconds). The prior art multivibrator approach, in contrast would require either a multiplicity of threshold detectors looking at a ramp or would require a multiplicity of ramp generators to provide an array of synchronizing outputs, all at an accuracy, stability, and adjustability far less than that provided by the present invention. Further, the digital approach of the invention facilitates accurate line up of input and playback sync signals at the video heads for purposes of editing.

Although reference has been made herein to some specific numerical examples, it will be appreciated by those of ordinary skill in the art that these examples may be modified within the teachings herein for variant applications of the invention. The scope of the invention is, therefore, to be limited only by the appended claimed.

What is claimed is:

1. A synchronizing pulse processor for a video tape recorder wherein synchronizing pulses at the television field rate, frame rate and horizontal line rate are processed, said synchronizing pulse processor normally receiving reference horizontal pulses and reference field pulses normally related to said reference horizontal pulses, the combination comprising means receiving said reference horizontal pulses for generating clock pulses having a frequency at a multiple of the reference horizontal pulse frequency, means receiving said reference field pulses and said clock pulses for generating at least two field rate pulse outputs, said field rate pulse outputs spaced in time by an integral number of clock pulse intervals, one of said field rate pulse outputs synchronized to said clock pulses and said reference field pulses as a reference synchronous field output, the other of said field rate pulse outputs occurring before said reference field pulses as an advanced field pulse output, stable self-contained oscillator means for generating said clock pulses, and means for detecting the presence of said reference horizontal pulses to apply the multiple of said reference horizontal pulses as said clock pulses when said reference horizontal pulses are present and for simultaneously applying the pulses from said oscillator as said clock pulses to said field rate pulse generating means and removing said reference field pulses from said means for generating field rate pulses when said reference horizontal pulses are absent, whereby the change of clock pulse sources has substantially no effect on the substantially lower frequency field pulse rate.

2. A synchronizing pulse processor for a video tape recorder wherein synchronizing pulses at the television field rate, frame rate and horizontal line rate are processed, said synchronizing pulse processor normally receiving reference horizontal pulses and reference field pulses normally related to said reference horizontal pulses, the combination comprising means receiving said reference horizontal pulses for generating clock pulses having a frequency at a multiple of the reference horizontal pulse frequency, said means including a phase locked loop receiving said reference horizontal pulses as a reference signal, and means receiving said reference field pulses and said clock pulses for generating at least two field rate pulse outputs, said field rate pulse generating means including divide counter means receiving said reference field pulses as a reset to initially phase said counter means, said field rate pulse outputs spaced in time by an integral number of clock pulse intervals, one of said field rate pulse outputs synchronized to said clock pulses and said reference field pulses as a reference synchronous field output, the other of said field rate pulse outputs occurring before said reference field pulses as an advanced field pulse output.

3. A synchronizing pulse processor for a video tape recorder wherein synchronizing pulses at the television field rate, frame rate and horizontal line rate are processed, said synchronizing pulse processor normally receiving reference horizontal pulses and reference field pulses normally related to said reference horizontal pulses, the combination comprising means receiving said reference horizontal pulses for generating clock pulses having a frequency at a multiple of the reference horizontal pulse frequency, means receiving said reference field pulses and said clock pulses for generating at least two field rate pulse outputs, said field rate pulse outputs spaced in time by an integral number of clock pulse intervals, one of said field rate pulse outputs synchronized to said clock pulses and said reference field pulses as a reference synchronous field output, the other of said field rate pulse outputs occurring before said reference field pulses as an advanced field pulse output, means receiving said clock pulses for providing clock derived horizontal pulses at the horizontal line frequency rate, means receiving said clock derived horizontal pulses and said advanced field output pulses for providing a pulse in advance of each frame, and means receiving said pulse in advance of each frame and said reference synchronous field pulses for providing a reference frame pulse output in synchronism with said reference synchronous field output pulses.

4. The combination of claim 3 further comprising means for providing reference horizontal pulses derived from said clock pulses and phased by said reference frame pulses.

5. The combination of claim 4 further comprising means for providing a further reference field pulse output derived from said reference horizontal pulses and phased by said reference frame pulses.

6. The combination of claim 5 wherein said means for providing a further reference field pulse output further provides at least one time staggered reference field output selectively time displaced from said further reference field pulse output.

7. The combination of claim 3 further comprising means for providing a reference signal in synchronism with said clock pulses and said reference frame pulses, the frequency of said reference signal being an integral multiple of the frame rate in both 25 Hz and 30 Hz television systems.

8. A synchronizing pulse processor for a video tape recorder wherein synchronizing pulses at the television field rate, frame rate and horizontal line rate are processed, said synchronizing pulse processor normally receiving reference horizontal pulses and reference field pulses normally related to said reference horizontal pulses, the combination comprising means receiving said reference horizontal pulses for genrating clock pulses having a frequency at a multiple of the reference horizontal pulse frequency, means receiving said reference field pulses and said clock pulses for generating at least two field rate pulse outputs, said field rate pulse outputs spaced in time by an integral number of clock pulse intervals, one of said field rate pulse outputs synchronized to said clock pulses and said reference field pulses as a reference synchronous field output, the other of said field rate pulse outputs occurring before said reference field pulses as an advanced field pulse output, and delay means receiving said advanced field pulse output for selectively delaying said advanced field pulses by time increments equal to the period of said clock pulses.

9. The combination of claim 8 further comprising
means receiving said clock pulses for providing clock derived horizontal pulses at the horizontal line frequency rate,
means receiving said clock derived horizontal pulses and said advanced field output pulses for providing a pulse in advance of each frame, and
means receiving said pulse in advance of each frame and said selectively delayed advanced field output pulses for providing a conditioned frame reference pulse output selectively advanced or delayed in increments of said clock pulse period with reference to said reference field output pulses.

10. The combination of claim 9 further comprising
means for providing advanced or delayed reference horizontal pulses derived from said clock pulses and phased by said conditioned frame reference pulses.

11. The combination of claim 10 further comprising
means for providing a further reference field pulse output derived from said advanced reference horizontal pulses and phased by said conditioned frame reference pulses.

12. The combination of claim 11 wherein said means further provides at least one time staggered reference field output selectively time displaced from said further reference field pulse output.

13. The combination of claim 9 further comprising
means for providing a reference signal in synchronism with said clock pulses and said conditioned frame reference pulses, the frequency of said reference signal being an integral multiple of the frame rate in both 25 Hz and 30 Hz television systems.

14. The combination of claim 8 wherein said delay means comprises
controllable delay means receiving said advanced field pulse for providing a delayed advanced field pulse in response thereto, and
means for controlling the delay time of said controllable delay means.

15. The combination of claim 14 wherein said delay means further comprises
means for storing a clock pulse count representing the delay time of said controllable delay means.

16. The combination of claim 8 wherein said delay means comprises
counter means enabled by said advanced field pulse and clocked at said clock pulse rate,
means for storing a clock pulse count representing a desired delay time of said advanced field pulses, and
means for providing a delayed advanced field pulse when the stored clock pulse count representing the delay time of said controllable delay means equals the count in said storage means.

17. A synchronizing pulse processor for a video tape recorder wherein synchronizing pulses at the television field rate, frame rate and horizontal line rate are processed, said synchronizing pulse processor normally receiving reference horizontal pulses and reference field pulses normally related to said reference horizontal pulses, the combination comprising means receiving said reference horizontal pulses for generating clock pulses having a frequency at a multiple of the reference horizontal pulse frequency,
means receiving said reference field pulses and said clock pulses for generating at least two field rate pulse outputs, said field rate pulse outputs spaced in time by an integral number of clock pulse intervals, one of said field rate pulse outputs synchronized to said clock pulses and said reference field pulses as a reference synchronous field output, the other of said field rate pulse outputs occurring before said reference field pulses as an advanced field pulse output,
controllable delay means receiving said advanced field pulse for providing a delayed advanced field pulse in response thereto,
means for controlling the delay time of said controllable delay means,
means receiving said clock pulses for providing clock derived horizontal pulses at the horizontal line frequency rate,
means receiving said clock derived horizontal pulses and said advanced field output pulses for providing a pulse in advance of each frame,
means receiving said pulse in advance of each frame and said selectively delayed advanced field output pulses for providing a conditioned frame reference pulse output selectively advanced or delayed in increments of said clock pulse period with reference to said reference field output pulses,
means for providing reference synchronous horizontal pulses in synchronism with said reference synchronous field output pulses and said clock pulses and wherein said means for controlling the delay time of said controllable delay means comprises
phase comparator means forming a portion of a closed loop, including the head-to-tape interface of said videotape recorder, receiving the off-tape horizontal sync pulses advanced in time by the combined record and playback delays of said videotape recorder and said reference synchronous horizontal pulses, for providing a delay control signal to minimize the phase difference of said pulses.

18. A synchronizing pulse processor for a video tape recorder wherein synchronizing pulses at the television field rate, frame rate and horizontal line rate are processed, said synchronizing pulse processor normally receiving reference horizontal pulses and reference field pulses normally related to said reference horizontal pulses, the combination comprising
means receiving said reference horizontal pulses for generating clock pulses having a frequency at a multiple of the reference horizontal pulse frequency,
means receiving said reference field pulses and said clock pulses for generating at least two field rate pulse outputs, said field rate pulse outputs spaced in time by an integral number of clock pulse intervals, one of said field rate pulse outputs synchronized to said clock pulses and said reference field pulses as a reference synchronous field output, the other of said field rate pulse outputs occurring before said reference field pulses us an advanced field pulse output, controllable delay means receiving said advanced field pulse for providing a delayed advanced field pulse in response thereto, means for controlling the delay time of said controllable delay means, means receiving said clock pulses for providing clock derived horizontal pulses at the horizontal line frequency rate, means receiving said clock derived horizontal pulses and said advanced field output pulses for providing a pulse in advance of each frame, means receiving said pulse in advance of each frame and said selectively delayed advanced field output pulses for providing a conditioned frame reference pulse output selectively advanced or delayed in increments of said clock pulse period with reference to said reference field output pulses, means for providing reference synchronous horizontal pulses in synchronism with said reference synchronous field output pulses and said clock pulses and wherein said means for controlling the delay time of said controllable delay means comprises phase comparator means forming a portion of a closed loop, including the head-to-tape interface of said videotape recorder, receiving the off-tape horizontal sync pulses and said reference synchronous horizontal pulses delayed by a time equal to the combined record and playback delays of said videotape recorder, for providing a delay control signal to minimize the phase difference of said pulses.

* * * * *